United States Patent [19]
Reudink

[11] Patent Number: 5,859,854
[45] Date of Patent: Jan. 12, 1999

[54] SYSTEM AND METHOD FOR FREQUENCY MULTIPLEXING ANTENNA SIGNALS

[75] Inventor: Douglas O. Reudink, Bellevue, Wash.

[73] Assignee: Metawave Communications Corporation, Redmond, Wash.

[21] Appl. No.: 520,000

[22] Filed: Aug. 28, 1995

[51] Int. Cl.[6] .................................................. H04J 1/00
[52] U.S. Cl. ........................ 370/480; 370/335; 370/465; 455/562; 348/6; 359/124
[58] Field of Search .................................. 370/277, 281, 370/343, 344, 480, 481, 307, 335, 342; 455/103, 118, 132, 272, 273, 275, 277.1, 277.2, 303, 340, 562, 436, 449; 359/124, 125; 375/295, 350; 348/10, 12, 7, 6; 376/465, 486

[56] References Cited

U.S. PATENT DOCUMENTS

| | | | |
|---|---|---|---|
| 3,578,898 | 5/1971 | Kuzminsky | 348/6 |
| 5,231,494 | 7/1993 | Wachob | 348/10 |
| 5,280,472 | 1/1994 | Gilhousen et al. | 370/18 |
| 5,301,056 | 4/1994 | O'Neill | 359/145 |
| 5,339,184 | 8/1994 | Tang | 359/124 |
| 5,347,535 | 9/1994 | Karasawa et al. | 375/1 |
| 5,351,269 | 9/1994 | Schilling | 370/335 |
| 5,396,489 | 3/1995 | Harrison | 370/307 |
| 5,504,936 | 4/1996 | Lee | 455/562 |
| 5,548,813 | 8/1996 | Charas et al. | 455/562 |
| 5,550,578 | 8/1996 | Hoarty et al. | 370/486 |
| 5,550,820 | 8/1996 | Baran | 370/465 |
| 5,576,717 | 11/1996 | Searle et al. | 455/562 |
| 5,606,575 | 2/1997 | Williams | 375/295 |
| 5,613,234 | 3/1997 | Vella-Coleivo | 455/303 |

OTHER PUBLICATIONS

Dennis A. Jiraud, "Broadband CDMA for Wireless Communication," Applied Microwave & Wireless, pp. 22–34.
CDMA Network Engineering Handbook, Draft Version XI, Chapter 2, pp. 2–1 through 2–12.

Primary Examiner—Hassan Kizou
Assistant Examiner—Shick Hom
Attorney, Agent, or Firm—Fulbright & Jaworski L.L.P.

[57] ABSTRACT

There is disclosed an antenna system and method of operation which allows for a large number of antennas to transmit signal streams to a similarly large number of receiver/transmit ports over a single communication channel. In operation, there is created a plurality of frequency bands each identified with a particular one of the antennas. The signal streams from each antenna are mixed so that they fall within the frequency band assigned to that antenna. The reduced signal streams, which now all fall within a preselected frequency band for each antenna, are then combined into a single wide band signal stream and communicated over a single communication channel to the remote end where the signals are separated into their respective signal streams and the separated signal streams are then mixed to recreate the originally received frequencies. The system can be arranged such that a selection process allows multiple radios to connect to any channel of any antenna.

43 Claims, 3 Drawing Sheets

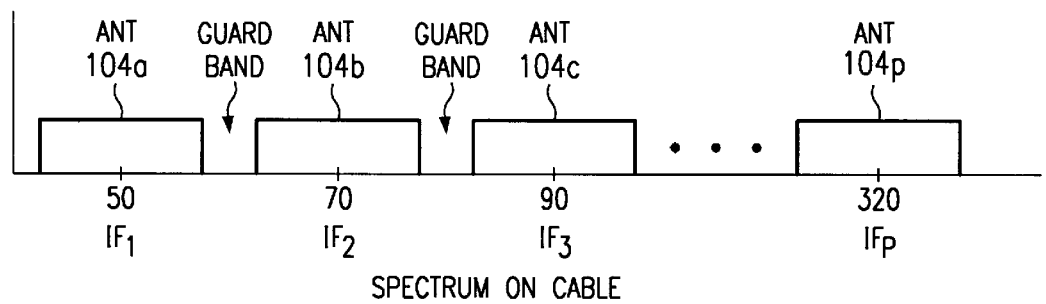
FIG. 2
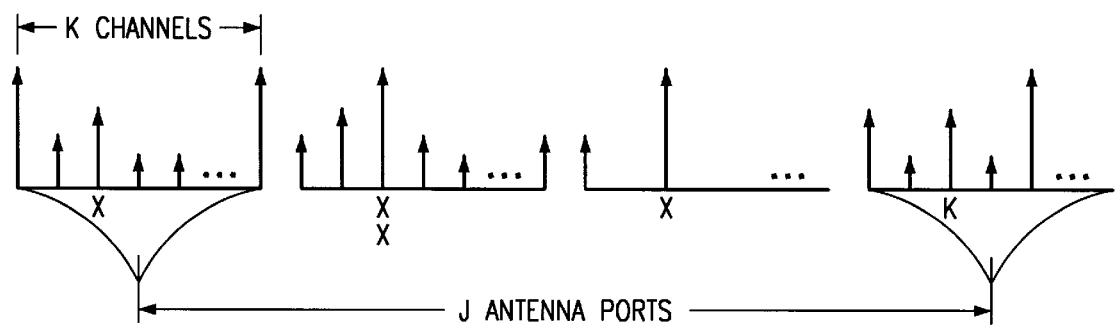
FIG. 3    X=DESIRED CHANNEL
XX=DESIRED ANTENNA
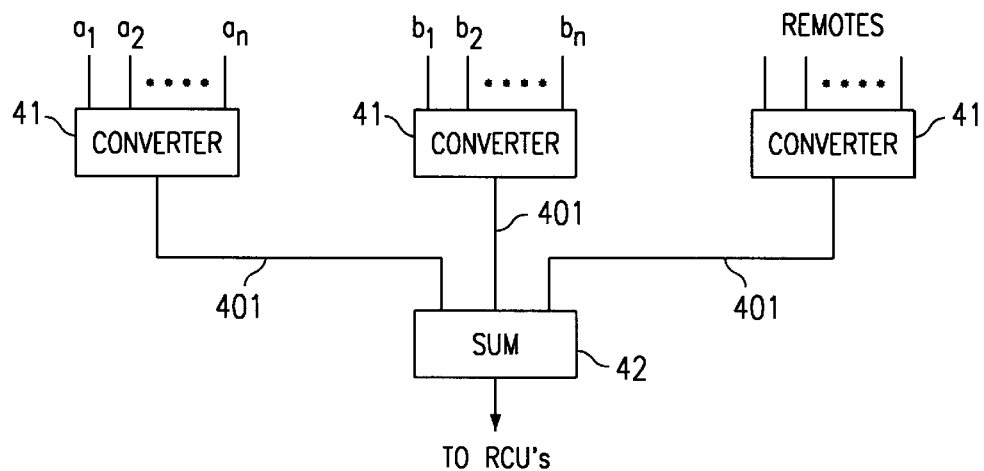
FIG. 4

SYSTEM AND METHOD FOR FREQUENCY MULTIPLEXING ANTENNA SIGNALS

RELATED PATENT APPLICATION

This application is related to commonly assigned, patent application Ser. No. 08/520,516, Titled: APPARATUS, SYSTEMS AND METHODS FOR MULTIPLE ANTENNA TRANSMISSION IN WIRELESS COMMUNICATIONS SYSTEMS, filed Aug. 28, 1995, and now U.S. Pat No. 5,648,968.

TECHNICAL FIELD OF THE INVENTION

This invention relates to antenna systems, and more particularly to such systems using a frequency multiplex technique where a number of antennas are connected to a number of radios.

BACKGROUND OF THE INVENTION

The switching and routing of signals between antennas and receivers/transmitters is a significant problem which must be addressed during the design and construction of multiple beam antenna systems. This is particularly true in "smart" multiple beam antenna systems where the goal is to couple the optimal antenna with an associated radio receiver or transmitter. While techniques are currently available for routing and switching signals in multiple beam antenna systems, they are typically complex, expensive to implement and require substantial amounts of hardware.

In general, the size, complexity and expense of the switching and routing system in a multiple beam antenna system is directly proportional to the number of antennas times the number of associated radios (receiver/transmitters). For example, in a typical cellular communications system, two antennas, a sector antenna and a diversity antenna, are provided per face. In some systems three "faces" are used, each of which covers a corresponding 120° sector of a 360° total field of view. In other systems, a single face may be used covered by an omnidirectional sector antenna and an omnidirectional diversity antenna. In each case, a transmit cable and/or a receive cable is required for every antenna beam employed. In multiple beam systems, such as the systems shown in Copending patent application Ser. No. 08/488,793, filed Jun. 8, 1995, Titled: NARROW BEAM ANTENNA SYSTEMS WITH ANGULAR DIVERSITY, now issued as U.S. Pat. No. 5,563,610, and Ser. No. 08/520,316, filed Aug. 28, 1995, Titled: APPARATUS, SYSTEMS AND METHODS FOR MULTIPLE ANTENNA TRANSMISSION IN WIRELESS COMMUNICATIONS SYSTEMS, and now U.S. Pat. No. 5,648,968 which are hereby incorporated by reference herein, where each face is covered by a number of narrow beams, the number of cables correspondingly increases. In these systems, anywhere from 12 to 40 separate antennas may be used per channel with perhaps 30–60 channels per cell site. In some situations, the ideal placement of antennas for a "cell site" might be hundreds of feet separated on diverse corners of a block square building. Using existing technology, this antenna placement becomes prohibitively expensive. Each cable may be between fifty to two hundred feet in length and cost several dollars per foot. Longer separations are impractical due to cable losses at RF frequencies.

The typical cellular communications system includes fifteen to twenty radios (receivers/transmitters) per face, with each radio being tuned to a given frequency (channel). Hence, notwithstanding the problem of cabling discussed above, the system switching matrix also becomes more complicated and expensive proportionate to the number of antenna beams and number of radios. For each face, one path must be provided from every antenna to every radio. In some embodiments, the capability must exist for any radio to be connected to any beam in any face. Consequently, for M number of radios, an M-way power divider is required per antenna. Further, for every radio there must be an N-way selector switch to couple that radio to a given one of the N number of antenna beams. In sum, for a system with M number of radios and N number of antennas, an M by N switching matrix is required. As the matrix grows larger and the component count grows, the reliability and mean time between failure decrease, while the cost and physical size of the switching system increases.

Thus, the need has arisen for improved apparatus, systems and methods for routing and switching signals between a multiple beam antenna system to one or more associated radios. Such apparatus, systems and methods should reduce the cost and complexity of switching and routing signals to and from the beams of multiple beam antenna systems, especially "smart" multiple beam antenna systems. Increases in system reliability and the ability to construct a more compact beam switching/routing system would also be advantageous. In some cases more antenna beams would be desirable, but is constrained by the number of cables; for example, in a situation where the cables are inside a hollow pipe.

SUMMARY OF THE INVENTION

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

In one embodiment, a number of different frequencies are established, each separated by a set guard band. Each of the antennas is assigned to a specific one of the established frequencies and the signal stream that comes from (or goes to) each antenna is down converted (or up converted) so that it fits within the established bandwidth assigned to that antenna. After reducing the signal streams from all of the antennas so that they fit within the defined frequency bands, they are summed together and placed on a single communication channel for delivery to the receiver/transmitters.

At the far end of the communication channel, which advantageously can be a coaxial cable or an optical fiber link, the summed signal stream is separated into frequency bands. To select any one of the antennas for reception/transmission, the specific one of the established frequency bands is then reverse up converted or down converted to derive the original frequency. These original frequency streams are then presented to the proper termination point, such as a radio tuned to a specific channel.

Using this arrangement, the necessity for a large number of cables running from the antenna tower to the control room is eliminated. The number of signal streams that are delivered to the remote end can be further reduced by a selection process, either at the antenna site or at the remote site which allows only signals meeting certain criteria to pass.

The single communication link can, in reality, be a multiple number of links, depending upon the desired structure, with the number being far less than would be required if all of the antennas were to be run to all of the receive ports without the use of the techniques of this invention.

One technical advantage of this invention is that there is eliminated the need for a massive number of cables or communication channels running from the tower to the control room thereby eliminating the complexity of the switching devices required and also reducing the opportunity for device failure.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 shows a chart of a typical frequency spectrum and the respective guard bands;

FIGS. 3 and 4 show details of the summing and reverse summing devices; and

DETAILED DESCRIPTION OF THE INVENTION

Figure 1:
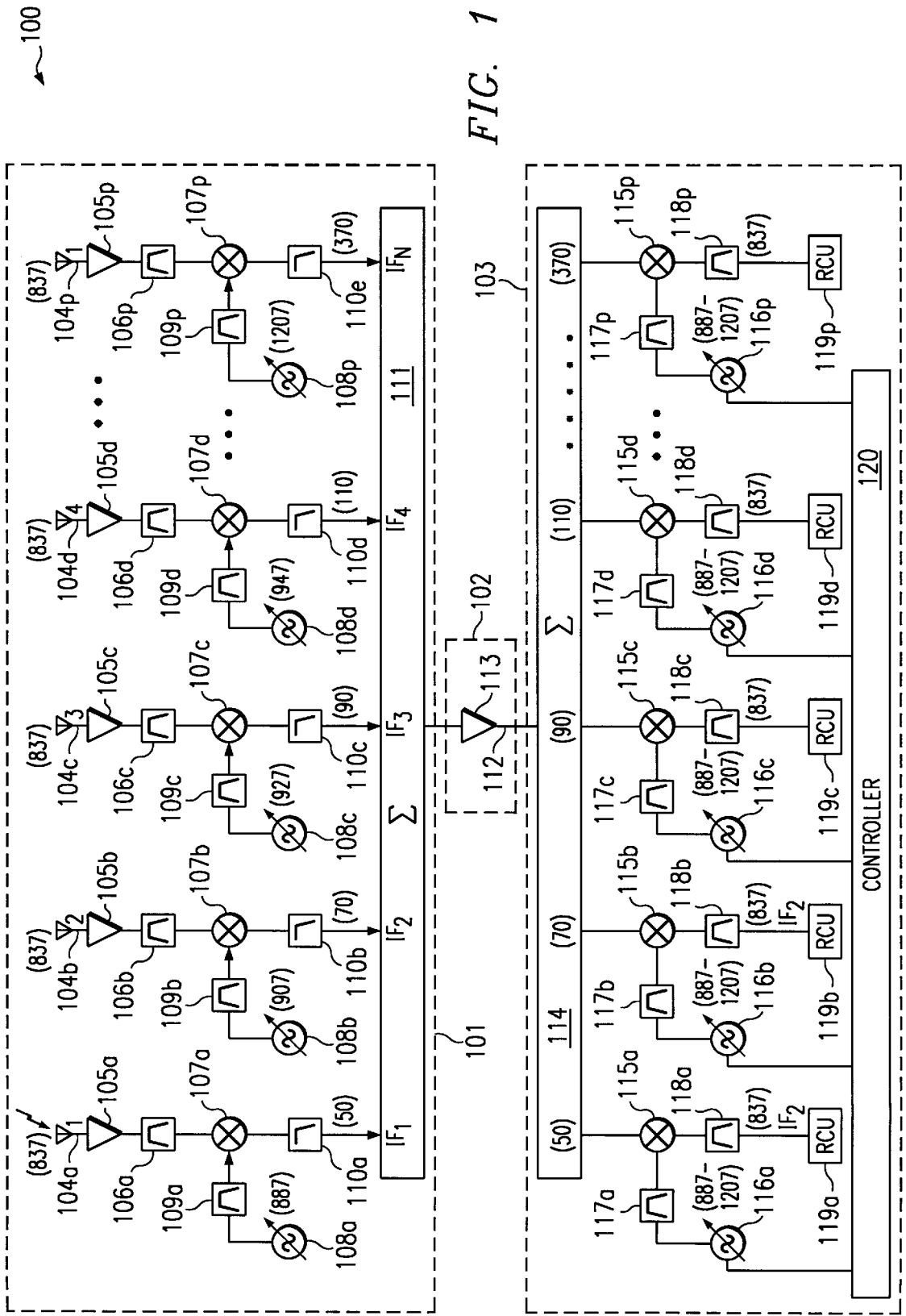
FIG. 1 shows a block diagram of the overall antenna system.
Figure 5:
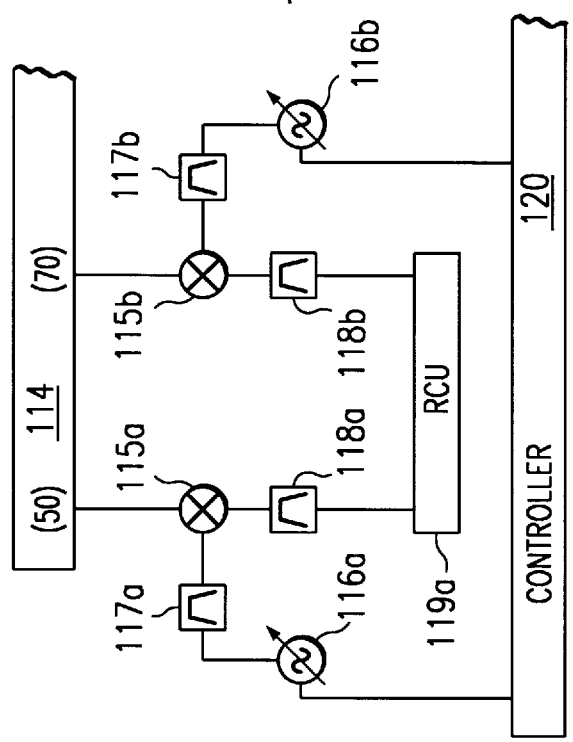
FIG. 5 shows a block diagram of the provision of signals to a diversity RCU.

The principles of the present invention and their advantages are best understood by referring to the illustrated embodiment depicted in FIGS. 1 and 2 of the drawings, in which like numbers designate like parts.

FIG. 1 is a functional block diagram of a receiving system 100 embodying the present invention. System 100 includes three primary units: a head assembly 101; an interconnection assembly 102; and a tuner assembly 103. Each of the these assemblies will be described in further detail below. In general, system 100 can be adapted for use in a substantial number of applications requiring multiple antennas, collocated and distributed, and/or antenna beams. In a preferred application, system 100 is utilized in a cellular telephone system.

Head assembly 102 includes a plurality of antennas 104, in the illustrated embodiment, 16 antennas 104a to 104p, although the number and location of antennas 104 will vary depending on the requirements of the application. In the cellular telephone environment, antennas 104 are tuned to frequency bands near to either 800 MHz or 1.8 GHz and may be for example, dipole antennas. In the drawing, please note that the numbers in parentheses are in MHz.

The output of each antenna 104 is passed through a low noise amplifier 105, sixteen of which are employed in system 100 of FIG. 1. Low noise amplifiers 105 generally improve the system noise figure. The output from each amplifier 105 is passed through a bandpass filter 106. Filters 106 are preferably ceramic filters and help define the band of interest and consequently the tuning process discussed further below. In some situations, a low loss filter is placed ahead of the low noise completion. Filters 106 also filter out signals at the transmit frequency in embodiments where antennas 104 are being used for both transmission and reception.

The signals received from each antenna 104 are next mixed down by a corresponding mixer 107. The local oscillator port of each mixer 107 is driven by a fixed or variable frequency local oscillator generator 108, the output of which is filtered by a bandpass filter 109. The output of each mixer 107 is then passed through a low pass filter 110. Low pass filters 100 filter out mixer spurs and harmonics and help define the band of interest discussed below.

The outputs of low pass filters 110 are coupled to the inputs of a power combiner 111. In the embodiment of FIG. 1, power combiner 111 performs 16 to 1 power combining. The single output of combiner 111 is transmitted by interconnection assembly 102. Interconnection assembly 102 includes a single interconnection cable 112 and a low noise amplifier 113 for noise figure improvement. The single interconnection cable 112 replaces the multiple cables which are required in prior art multiple beam/multiple antenna systems.

Signals from interconnection assembly 102 are passed to tuner section 103; specifically, the output from cable 112 coupled to the input of a power divider 114. In the illustrated embodiment where 16 antennas 104 are included in system 100, power divider 114 performs a 1 to 16 power division. Power division can also be performed by tapping off of the cable a portion of the energy (signals) at each radio location as the cable passes by each radio in a daisy chain fashion.

Each output of power divider 114 is coupled to the input of a corresponding mixer 115. The LO port of mixers 115 are driven by an associated variable frequency source 116, the outputs of which are filtered by bandpass filters 117. By tuning the LO to the same frequency as the LO, of an associated antenna, the signal from that antenna is selected for that radio. As discussed further below, mixers 115 up-convert the frequency of the signals output from the corresponding ports of power divider 114.

The output from each mixer 115 is passed through a fixed frequency (same as at the antenna port) filter 118 to an associated receiver unit 119. Receiver units 118 may be for example a time division multiple access (TDMA) receiver, a code division multiple access (CDMA), or other type of radio receiver. In the preferred embodiment, receivers 119 are receivers of a type typically used in cellular communications systems.

The operation of the antenna system 100 can now be described in detail. Assume for discussion purposes that antennas 104 are receiving signals at the cellular telephone carrier frequency of 837±7 MHz and that the channel bandwidth is 14 MHz. Also assume for illustration purposes that the minimum intermediate frequency (IF) is selected to be 50 MHz and that the center-to-center spacing of the downconverted signals output from mixers 107 is selected to be 20 MHz. It should be noted that each of these parameters will vary from embodiment to embodiment of the present invention. For example, the received signals may be at the PCS frequency of 1.8 GHz and channel bandwidth and IF spacing accordingly varied.

For a typical 1.8 GHz system, the IF frequency would be 5 or 15 MHz wide with a 1 or 5 MHz guard band.

In the present example, the 837 MHz carrier received by antenna 104a is mixed with a LO signal at a frequency of 887 MHz to obtain an IF frequency at the selected minimum of 50 MHz. The 837 MHz carrier received at the next antenna, antenna 104b, is mixed down with a 907 MHz LO to obtain an IF signal at 70 MHz, which is spaced from the mixed down output of antenna 104a by the selected center-to-center spacing of 20 MHz apart for the corresponding antennas 104c–104p. The IF signals from mixers 107 are combined by power combiner 111 into a single signal for output on cable 112.

A portion of the output of power combiner 111 is show in FIG. 2 where the spectrum on connector 102 is shown.

$IF_j = f - LO_j$. Therefore to select antenna j at any RCU the controller simply tunes the tuneable LO at that RCU to $LO_j$ and upconverts.

$$f = IF + LO = f - LO + LO = f$$

All other antenna signals lie in different frequency bands. Controller 120 could be used to scan all antennas to select the optimum antenna for each RCU. Normally one scanning receiver might control several RCU's. Controller 120 could sample signals on various channels and antennas to make the appropriate selection. In addition, controllers could be "gauged" such that a local controller could also receive information from another controller or from a master controller connected to several controllers. Thus, a local controller can either measure power levels or receive instructions for control from an external source based on other parameters. The controller may use single or multiple receivers. Since every channel on every antenna has a different frequency, speed of scanning depends on channel.

To possibly reduce filtering requirements this technique also works by upconverting the entire band to a higher frequency and performing channel selection at the RCU by down conversion.

$$IF = f + LO \ \ SELECT: f = IF - LO = f + LO - LO$$

By building a wider range for tuning RCU, the frequency conversion in front of the RCU could be eliminated. For example, if each antenna port were upconverted by 200 MHz+20j MHz, where j is the antenna port number, then say for 30 antennas and a 20 MHz spacing, the receivers would need to tune from 1 GHz to 1.6 GHz for a 800 MHz carrier.

The technique also applies to down conversion where, for example, if 100 MHz is the lowest IF frequency, the tuning range for the LO for selection would range from 100 to 700 MHz. It should be noted that if there are K signals (typically carriers transmitted by mobiles; for example, AMP's have 333 carriers in the 10 MHz portion of a single service providing spectrum allocation), then the $k^{th}$ radio channel on the $j^{th}$ antenna would be at a frequency of:

$$100,000 + 20,000j + 30k \ Hz$$

By changing j and k independently, the radio can select any channel on any antenna port. This is shown in FIG. 3. It is not required that IF's and channel spacing be evenly spaced, as long as the desired antenna channel pair represents a unique frequency.

Summing devices 111 are commercially available with up to 48 or more input parts. A typical configuration may utilize a cascade of 2:1 summers. An example would be the power splitters/combiners as shown in the Mini-Circuits catalog.

The expansion device 114 may be the reverse of the summation devices. A better alternative (similar to cable TV) is to use a coupling device (for example, a 20 dB coupler, where only 1% of the energy is taken from the line for any radio).

FIG. 4 shows the situation where the antennas could be located at different physical locations and the converters 41 would essentially be block 100 of FIG. 1 without block 111. The converted signals would be sent over a communication medium 401, such as coax, microwave fiber, or any other medium. This technique also applies to microcell situations.

Note that simultaneous transmission and reception can be processed on a single channel as long as transmit and receive frequencies are different. In cellular there is a 45 MHz separation. Transmission occurs at different IF's than reception. Thus, a broader band IF signal will support transmission and reception. While it is expected that transmission to and from an antenna will be on a common media, this is not necessarily so and separate transmission links could be used.

Although the present invention and its advantages have been described in detail, it should be understood that various changes, substitutions and alterations can be made herein without departing from the spirit and scope of the invention as defined by the appended claims.

What is claimed is:

1. An antenna system for delivering signals received on a plurality of antennas to a plurality of associated receivers, said system comprising:

means for establishing a plurality of specific frequency bands, each said frequency band separated from the next by a preset margin, each one of said frequency bands assigned to a unique one of said antennas;

means for processing the signal stream received from each said antenna such that said received signal stream falls within said frequency band assigned to said antenna, wherein a processed received signal stream associated with a first said antenna and a processed received signal stream associated with a second said antenna include a same signal;

means for combining all processed signal streams into a signal stream for delivery to said receivers over a communication channel thereby providing a delivered communication channel signal stream; and means for separating said delivered communication channel signal stream into individual signal streams corresponding to ones of said signal streams received from said antennas, each said individual signal stream for delivery to at least one of said receivers, wherein said separating means provides said delivered communication channel signal stream for selection of any one of said signal streams received from said antenna at any one of said plurality of associated receivers.

2. The invention set forth in claim 1 wherein said communication channel includes a coaxial cable.

3. The invention set forth in claim 1 wherein said communication channel includes a Fiber Optic Link.

4. The invention set forth in claim 1 wherein at least one of said receivers includes multiple diversity inputs from at least two antennas, wherein said separating means provides a signal stream received from said first antenna including said same signal to a first one of said multiple diversity inputs and a signal stream received from said second antenna including said same signal to a second one of said multiple diversity inputs.

5. The invention set forth in claim 1 wherein said communication channel includes a radio link.

6. The invention set forth in claim 1 wherein each said frequency band is approximately 15 MHz.

7. The invention set forth in claim 6 wherein said preset interband margin is approximately 5 MHz.

8. The invention set forth in claim 1 wherein the total bandwidth of said communication channel is N(B+M), where N is the number of antennas, B is the width of each said frequency band and M is the width of each said interband margin.

9. The invention set forth in claim 8 where the bandwidth of each antenna is W and wherein B equals approximately 3 times W.

10. The invention set forth in claim 9 wherein W is 14 MHz, B is approximately 50 MHz and M is approximately 20 MHz.

11. The invention set forth in claim 1 wherein said communication channel includes a transmission medium having a bandwidth of N(B+M), where N is the number of antennas, B is the width of each said frequency band and M is the width of each said interband margin.

12. The invention set forth in claim 1 wherein said processing means includes at least one tunable filter element.

13. The invention set forth in claim 1 wherein said separating means includes at least one tunable filter element.

14. The invention set forth in claim 1 wherein said separating means includes means for selecting certain of said signal streams prior to delivery to the respective receivers.

15. A method of delivering high frequency signals received on a plurality of discrete inputs to a remotely located plurality of associated discrete utilization ports, said method comprising the steps of:
   establishing a plurality of specific frequency bands, each said frequency band separated from the next by a preset margin and each said frequency band assigned to a unique one of said inputs;
   processing the signal stream received at each said discrete input such that said received signal stream falls within said frequency band assigned to said input;
   combining all processed signal streams into a communication signal stream for delivery to said ports over one or more communication channels;
   splitting said combined communication signal stream into a plurality of substantially identical combined communication signal streams, wherein each one of said plurality of substantially identical combined communication signal streams is associated with a particular one of said utilization ports; and
   separating a select one of said received signal streams from said substantially identical combined communication signal stream associated with a particular utilization port for delivery to said particular utilization port, wherein any one of said received signal streams may be selected for delivery to said particular utilization port.

16. The method set forth in claim 15 wherein said separating step includes the step of:
   adjusting a local oscillator to a frequency corresponding to a particular processed signal stream for delivery of said select received signal stream to said particular utilization port.

17. The method set forth in claim 15 wherein said separating step includes the step of:
   selecting certain of the signal streams for delivery to the particular discrete utilization port.

18. The method set forth in claim 15 wherein said combining step includes the step of:
   selecting certain of the signal streams for delivery to said ports.

19. The method set forth in claim 15 wherein said processing step includes the step of:
   filtering the signals under control of a filter tuned to the frequency selected for an associated antenna.

20. A signal delivery system for delivering communication signals received from a plurality of sources to a plurality of utilization devices, said system comprising:
   channel allocation circuitry for establishing a plurality of specific communication bands, each said communication band separated from the next by an established frequency margin, each one of said communication bands assignable to a unique one of said signal sources;
   said channel allocation circuitry further operable for processing the signal stream received from each said signal source such that said received signal stream falls within said frequency band assigned to said source;
   summing circuitry for combining all processed signal streams into a reduced number of signal streams for delivery to the utilization devices;
   separating circuitry for expanding the processed and summed signal stream into individual signal streams, each signal stream for delivery to one of said utilization devices;
   means for monitoring signals selected from the group consisting of the signal stream received from said signal sources and said processed signal streams, said monitoring means also for selecting ones of the processed signals to be expanded from the processed and summed signal stream based upon characteristics of the monitored signals;
   means controlled by information received from an external source for selecting at least one of said ones of the signals to be expanded from the processed and summed signal stream based upon criteria contained within the received information; and
   means for delivering the processed and summed signal streams from the summing circuitry to the separating circuitry.

21. The invention set forth in claim 20 wherein one of said characteristics is the power level of the received signals.

22. The invention set forth in claim 20 wherein the delivery means includes a high band width communication medium.

23. The invention set forth in claim 22 wherein the communication medium is fiber optics.

24. The invention set forth in claim 22 wherein the communication medium is microwave.

25. The invention set forth in claim 22 wherein the communication medium is coaxial cable.

26. The invention set forth in claim 20 wherein the signal sources are at different physical locations and wherein the processed signals from each of the locations are delivered to summing circuitry common to all of the locations.

27. A method for delivering communication signals received from a plurality of sources to a plurality of utilization devices, said method comprising the steps of:
   establishing a plurality of specific communication bands, each said communication band separated from the next by an established frequency margin, each one of said communication bands assignable to a unique one of said utilization devices;
   processing the signal stream received from ones of said signal sources such that the received signal stream falls within a selectable one of said communication bands;
   delivering the processed signal streams by combining said processed signal streams into a reduced number of signal streams for delivery to the utilization devices; and
   expanding the delivered processed and combined signal streams into individual signal streams corresponding to said processed ones of said received signal streams, each individual signal stream for delivery to the one of said utilization devices said select one of said communication bands is assigned.

28. The invention set forth in claim 27 wherein the processing step includes the steps of:

monitoring the signal sources; and selecting which of the processed signals are to be expanded based upon characteristics of the monitored signals.

29. The invention set forth in claim 28 wherein said selecting step further includes the step of:

accepting information received from a source other than the signal strength of the associated source signals for selecting which of the signals are to be expanded.

30. The invention set forth in claim 28 wherein one of the characteristics is the power level of the received signals.

31. The invention set forth in claim 27 wherein said expanding step includes the step of:

monitoring the processed signals for selecting which of the monitored signals are to be expanded based upon characteristics of the monitored signals.

32. The invention set forth in claim 31 wherein said monitoring step further includes the step of:

receiving control signals from an external source for controlling which of the processed signals are to be expanded.

33. The invention set forth in claim 27 wherein the delivery step includes use of a high band width communication medium.

34. The invention set forth in claim 33 wherein the communication medium is fiber optics.

35. The invention set forth in claim 33 wherein the communication medium is microwave.

36. The invention set forth in claim 33 wherein the communication medium is coaxial cable.

37. The invention set forth in claim 27 wherein the signal sources are at different physical locations.

38. The method set forth in claim 37 wherein the processed signals from each of the locations are summed common to all of the locations.

39. A transmission system for delivering signals received from a plurality of radios to a plurality of associated antennas, said system comprising:

means for establishing a plurality of specific frequency bands, each said frequency band separated from the next by a preset margin, each one of said frequency bands assigned to a unique one of said radios;

means for processing the signal stream received from each said radio such that said received signal stream falls within said frequency band assigned to said radio;

means for combining all processed signal streams into a signal stream for delivery to said antennas over a communication channel;

means for separating said delivered communication channel signal stream into individual signal streams corresponding to ones of said signal streams received from said antennas, each said individual signal stream for delivery to at least one of said receivers, wherein said separating means provides said delivered communication channel signal stream for selection of any one of said signal streams received from said antenna at any one of said plurality of associated receivers; and means at least partially controlled by information received from an external source for selecting at least one of said ones of the signals to be separated from the delivered communication channel signal stream for a particular one of said plurality of associated receivers.

40. The invention set forth in claim 39 wherein said communication channel includes a coaxial cable.

41. The invention set forth in claim 39 wherein said communication channel includes a Fiber Optic Link.

42. A method for bidirectional transmission between a plurality of antennas and a plurality of transmitters/receivers, said method comprising:

establishing a first plurality of specific frequency bands for transmission from the antennas to the transmitters/receivers;

establishing a second plurality of specific frequency bands for transmission from the transmitters/receivers to the antennas;

processing the signal streams received from the antennas and from the transmitters/receivers such that the received signal streams fall within the respective bands assigned to said antennas and to said transmitters/receivers;

combining the processed signals from the antennas into a first signal stream for delivery to said transmitters/receivers and combining the processed signals from the transmitters/receivers into a second signal stream for delivery to said antennas;

delivering both said first and said second signal streams to the respective destination of said signal stream;

splitting said first delivered signal stream into a plurality of substantially identical combined communication signal streams, wherein each one of said plurality of substantially identical combined communication signal streams is associated with a particular one of said plurality of transmitters/receivers;

separating a select one of said signal streams received from the antennas from said substantially identical combined communication signal stream associated with a particular utilization port for delivery to said particular transmitter/receiver, wherein any one of said signal streams received from the antennas may be selected for delivery to said particular transmitter/receiver; and selecting at least under partial control of information received from an external source at least one of said ones of the signals to be delivered to said particular transmitter/receiver.

43. The invention of claim 42 wherein said delivering step includes the step of:

placing said first and said second signal streams on a common transmission media.

* * * * *